(No Model.) 2 Sheets—Sheet 1.
F. M. LOCKE & J. LAPP.
ELECTRIC LINE HOOK.
No. 441,849. Patented Dec. 2, 1890.
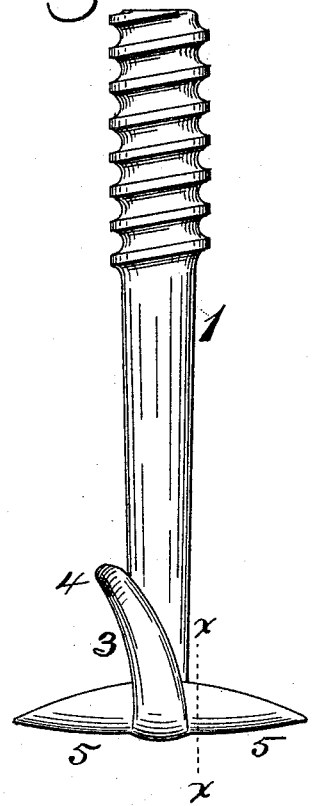
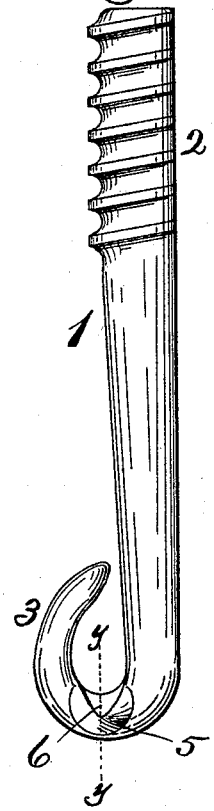
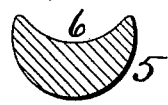
Witnesses
H. A. Carhart
E. O. Mack
Inventors
Fred M. Locke &
John Lapp
By their Attorneys
Smith & Denison (No Model.) 2 Sheets—Sheet 2.
F. M. LOCKE & J. LAPP.
ELECTRIC LINE HOOK.
No. 441,849. Patented Dec. 2, 1890.
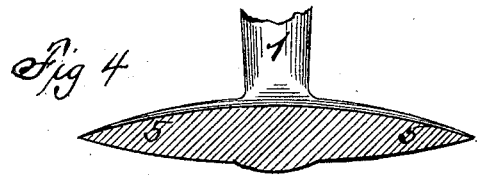
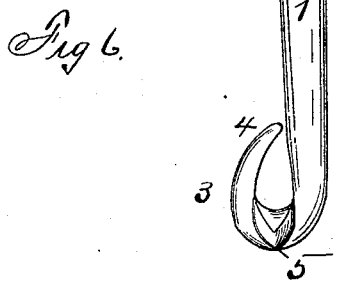
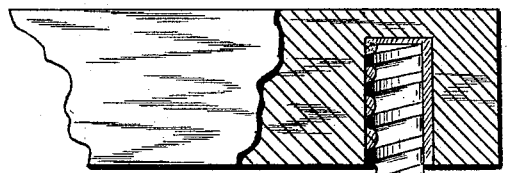
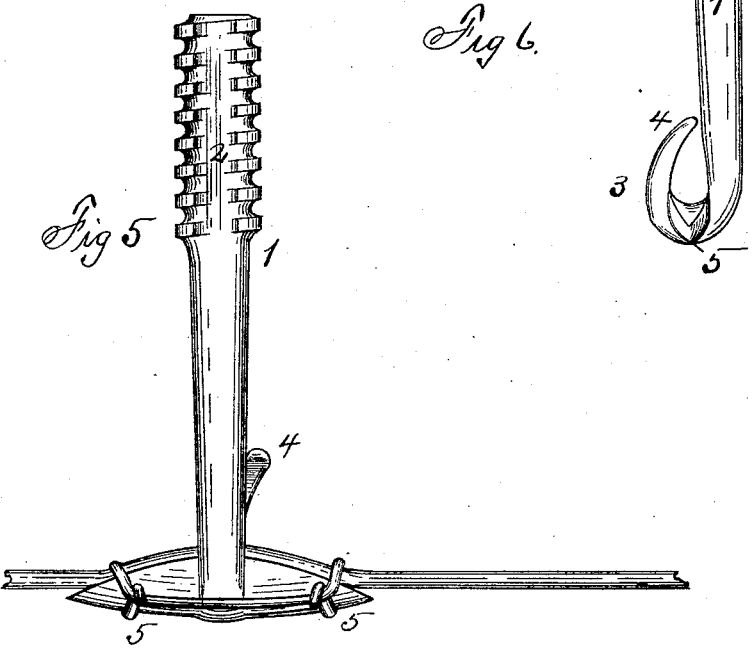
Witnesses
E. V. Mack.
H. A. Carhart.
Fred M. Locke
John Lapp
Inventors
By their Attorneys
Smith & Denison

UNITED STATES PATENT OFFICE.

FRED M. LOCKE, OF VICTOR, AND JOHN LAPP, OF ROCHESTER, ASSIGNORS OF ONE-THIRD TO THEODORE M. NORTON, OF VICTOR, NEW YORK.

ELECTRIC LINE-HOOK.

SPECIFICATION forming part of Letters Patent No. 441,849, dated December 2, 1890.

Application filed September 8, 1890. Serial No. 364,259. (No model.)

*To all whom it may concern:*

Be it known that we, FRED M. LOCKE and JOHN LAPP, of Victor, in the county of Ontario, and Rochester, Monroe county, in the State of New York, respectively, have invented new and useful Improvements in Insulators for Electric Wires, of which the following, taken in connection with the accompanying drawings, is a full, clear, and exact description.

Our invention relates to line-hooks used for supporting telegraph and other electric wires.

Our object is to produce a line-hook which will permit a knot or splice to pass through the hook portion, in which the wire cannot be raised out of the hook by a direct longitudinal strain, and which is provided with arms, to which the wire can be secured by a tie-wire.

Our invention consists in the several novel features of construction hereinafter described, and which are specifically set forth in the claims hereto annexed. It is constructed as follows, reference being had to the accompanying drawings, in which—

Figure 1 is a front elevation. Fig. 2 is a side elevation. Fig. 3 is a transverse vertical section on line X X, Fig. 1. Fig. 4 is a longitudinal vertical section through the arms on line Y Y, Fig. 2. Fig. 5 is a view of the shank detached, showing a wire secured to the arms by means of a tie-wire. Fig. 6 is a view of the shank inserted in a supporting-arm, a portion of said arm being broken away to show threads.

This line-hook consists of a threaded shank 1, reduced in size longitudinally, as at 2, on one vertical face, a hook 3 upon its lower end, the upper end of which is bent to one side, as at 4, and arms 5, projecting laterally from the bottom of the hook. The point of the hook stands far enough away from the shank to permit a wire to pass freely through the space down into the hook when the wire is bent partly around the shank, and then when the wire is drawn in a direct line it cannot be lifted out vertically without being deflected. The opening through the hook is large enough to permit a knot or splice to be drawn through it freely when the wire is being tightened. When taut, the wire is tied by a tie-wire around the arms on each side, the wire lying in the concavity 6 of the arms and being slightly bent or crimped over the arch of the arms, which secures it better against slipping. The flattened side of the shank enables us to pour the melted sulphur around the shank and to fill the opening in the insulator clear to the bottom, it being a fact that if the shank be made full size clear around the sulphur will cool before reaching the bottom, and thus will not fill the opening.

We do not limit ourselves to a shank flattened upon one side, as it is very evident that the same results can be obtained by constructing a groove in one side thereof.

What we claim as our invention, and desire to secure by Letters Patent, is—

1. A line-hook provided with a shank longitudinally reduced in size on one side and threaded around the balance.

2. A line-hook consisting of a shank, a hook upon its lower end, and arms projecting laterally from the hook.

3. A line-hook consisting of a shank, a hook upon its lower end, and arms projecting laterally therefrom and concaved longitudinally.

4. A line-hook consisting of a shank, a hook upon its lower end, and arms projecting laterally therefrom and arching upward between their extremities.

5. A line-hook consisting of a shank, a hook upon its lower end, and arms projecting laterally therefrom and arched upward between their extremities and concaved longitudinally.

In witness whereof we have hereunto set our hands this 21st day of August, 1890.

FRED M. LOCKE.
JOHN LAPP.

In presence of—
Z. C. CURTICE,
H. P. DENISON.